US008188197B2

(12) United States Patent
Gubaydullin et al.

(10) Patent No.: US 8,188,197 B2
(45) Date of Patent: May 29, 2012

(54) METHOD FOR PRODUCING A POLYMER

(75) Inventors: Ilshat Gubaydullin, Ludwigshafen (DE); Karl-Heinz Wassmer, Mutterstadt (DE); Robert Rupaner, Ellerstadt (DE); Jochen Kessler, Hassloch (DE); Guillermo Arens, Frankenthal (DE); Gerald Wildburg, Speyer (DE); Christian Magin, Schifferstadt (DE); Wolfgang Huemmer, Birkenheide (DE); Lambertus Manders, Ludwigshafen (DE); Rudolf Schuhmacher, Boehl-Iggelheim (DE); Oliver Birkert, Fussgoennheim (DE)

(73) Assignee: BASF SE, Ludwigshafen (DE)

( * ) Notice: Subject to any disclaimer, the term of this patent is extended or adjusted under 35 U.S.C. 154(b) by 74 days.

(21) Appl. No.: 12/742,552

(22) PCT Filed: Sep. 8, 2008

(86) PCT No.: PCT/EP2008/007317
§ 371 (c)(1),
(2), (4) Date: May 12, 2010

(87) PCT Pub. No.: WO2009/083044
PCT Pub. Date: Jul. 9, 2009

(65) Prior Publication Data
US 2010/0261853 A1    Oct. 14, 2010

(30) Foreign Application Priority Data

Dec. 21, 2007 (EP) .................................... 07024978

(51) Int. Cl.
*C08F 2/00* (2006.01)
*C08F 4/00* (2006.01)
*C08F 4/28* (2006.01)
*B01J 10/00* (2006.01)

(52) U.S. Cl. .............. 526/59; 526/61; 526/89; 526/227; 422/129

(58) Field of Classification Search .................... 526/59, 526/61, 89, 227; 422/59, 129
See application file for complete search history.

(56) References Cited

U.S. PATENT DOCUMENTS
2,974,126 A    3/1961    Kelley
(Continued)

FOREIGN PATENT DOCUMENTS
JP    11 295205    10/1999

OTHER PUBLICATIONS

Wassmer, Karl-Heinz et al., "A Unified Model for the Mixing of Non-Newtonian Fluids in the Laminar, Transition, and Turbulent Region", Macromolecular Materials and Engineering, vol. 290, pp. 294-301, (2005).
Yao, W.G. et al., "Mixing performance experiments in impeller stirred tanks subjected to unsteady rotational speeds", Chemical Engineering Science, vol. 53, No. 17, pp. 3031-3040, (1998).

(Continued)

Primary Examiner — William Cheung
(74) Attorney, Agent, or Firm — Oblon, Spivak, McClelland, Maier & Neustadt, L.L.P.

(57) ABSTRACT

The present invention relates to a method for performing a polymerization process in a stirred reactor, wherein a critical time window is determined by means of a monitor of at least one polymerization process parameter and an associated process window, and when a critical time window is present, an adaptation of process conditions is made in order to configure the polymerization process to conform to the process window.

23 Claims, 1 Drawing Sheet

U.S. PATENT DOCUMENTS

| | | | |
|---|---|---|---|
| 3,356,667 A | 12/1967 | Smith et al. | |
| 4,833,180 A | 5/1989 | Brulet | |
| 5,504,166 A | 4/1996 | Buchelli et al. | |
| 6,991,763 B2 * | 1/2006 | Connelly et al. | 422/62 |

OTHER PUBLICATIONS

U.S. Appl. No. 13/318,964, filed Nov. 4, 2011, Raman, et al.
U.S. Appl. No. 13/318,911, filed Nov. 4, 2011, Raman, et al.

* cited by examiner

METHOD FOR PRODUCING A POLYMER

This application is a U.S. national stage application claiming the benefit of International Application No. PCT/EP2008/007317 filed Sep. 8, 2008, which claims benefit of European Patent No. 07024978.4 filed Dec. 21, 2007.

The present invention relates to a method for producing a polymer.

The classical parameters which are relevant when setting up a polymerization process are the composition of the polymer, the reaction temperature, the viscosity, the reaction pressure, concentration ratios of the reactants, the pH in the case of aqueous systems, the molecular weight distribution and the particle size of a heterophase polymer. Other process-relevant quantities derivable from the process are the heat transfer coefficient, the mixing time, the degree of dispersing, shear load and maximum shear stress and the power input. It should be understood here that the first-mentioned parameters rather characterize the polymeric product while the process-relevant quantities on the other hand describe and characterize the process and the process control. Reliable process control, in particular in relatively large reaction containers, ensures that the reaction product is obtained exactly with said and required product properties.

EP 1 163 504 B1 discloses a method for producing latex by emulsion polymerization, the online monitoring/control being effected by means of Raman spectroscopy. The data obtained on the basis of the Raman spectra are compared with specific reference data and, starting from this comparison, the reaction parameters are controlled so that a deviation of the measured data from the reference data is minimized. In particular, temperature, pressure, movement of the medium and metering of the monomer are mentioned as reaction parameters.

U.S. Pat. No. 6,657,019 B2 discloses a method for predicting polymer latex properties in a polymerization method, in which a set of parameters of the method is measured and is evaluated on the basis of heat and mass balance and the data obtained are compared with a set of predetermined data and statistical relationships between the parameters of the method in order thus to predict the properties of the polymer.

U.S. Pat. No. 6,991,763 B2 discloses a method for controlling the monomer level in a polymerization reaction. This method is based on a calorimetric measurement in which the cooling medium temperature at the entrance of the cooling jacket and at the exit of the cooling jacket and the flow rate of the cooling medium are measured. The heat transfer is determined from these values and is compared with a target value for the heat output. Starting from this, the monomer feed is regulated.

Waβmer et al., in "A Unified Model for the Mixing of Non-Newtonian Fluids in the Laminar, Transition and Turbulent Region", Macromol. Mater. Eng. 2005, 290, 294-301, are concerned with the power input calculation in the case of structurally viscous systems comprising fluids for which a Reynolds number cannot be calculated directly. It is found that the fluid behavior of non-Newtonian fluids has a considerable influence on the calculation of process-relevant parameters, in particular power input, mixing time and heat transfer. A relationship between shear stress and specific power input is described. Furthermore, it is stated that the effective shear rate in the transition region between laminar and turbulent in a vessel and the stirrer speed are not linearly dependent.

U.S. Pat. No. 4,833,180 discloses a method for producing polyvinyl chloride, in which the polymerization process is adjusted so that a certain shear rate (between a paddle stirrer and a deflector) is achieved. A relationship between shear rates and coagulum formation or variation of the shear rates for avoiding coagulum formation is not discussed.

K. Takahashi et al., in "Mixing performance experiments in impeller stirred tanks subjected to unsteady rotational speeds", Chem. Engineering Science, Vol. 53, No. 17, p. 3031-3040 (1998), show the influence of different stirring profiles on the speed of a decolorization reaction in a highly viscous, homogeneous polymer solution. From the results, it is concluded that the increase in the turbulence of the liquid phase due to the non-stationary stirring conditions leads to an improvement in the mixing effect. The method presented comprises a decolorization reaction in a transparent solution which permits the required changes in the stirring conditions without problems. However, the discoveries cannot be applied to disperse systems which are not transparent, frequently have shear-dependent viscosity values and show shear-dependent coagulation.

It is an object of the invention to provide a method for producing polymers, in which in particular the heat removal is optimized and in which no coagulation of the polymer particles produced occurs. A deterioration in the product properties is to be avoided.

It has now been found that a process optimization can be effected by determining so-called critical time windows within which the process threatens to become faulty, i.e. for example coagulum formation, increased foam formation or stirring of gas into the product begins. During such a critical time window, the process should be returned to the corresponding process window or should be kept in said window in a targeted manner.

This can be achieved, for example, by influencing the flow behavior, which in turn can be effected in particular by varying the stirring speed but also by varying other suitable parameters.

Preferred polymerization process parameters are the heat transfer coefficient, the reaction temperature, the reaction pressure, the specific mixing time, the conversion in the reaction, the shear stress, the degree of dispersing or the specific power input. The chemical composition of the polymer should not be changed.

Suitable parameters to be adapted are the heat transfer coefficient, the mixing time, the conversion in the reaction, the shear stress or the specific power input. The shear stress is preferred since it can be easily determined and can be changed by changing the stirrer speed and is frequently responsible for the formation of undesired byproducts. The determination of the shear stress can be effected by empirical methods (trial and error), via a shear stress measurement or viscosity measurement (i.e. using a reaction viscometer) or by means of a rheometric cell.

Process window is understood as meaning the possible range of all process parameters as a function of the reaction time in which a reaction product is obtained which meets the requirements. The requirements are defined by the corresponding performance characteristics of the product.

For the respective polymerization process, the sensitivity of the reaction with respect to the selected parameter must first be determined. This is effected by determining the process window of the selected parameter. For this purpose, the limits within which the selected parameters can be varied in the process under consideration are determined, for example in preparatory laboratory experiments. The critical time window for the selected parameter is then determined. This can be done online or offline and can be effected on the laboratory, pilot or production scale.

In the case of the shear stress, this means, for example, determining the critical time window with the greatest sensitivity to shearing during the course of the reaction. Preferably, the determination of the critical time window is effected by comparison of a (measured) value for the at least one polymerization process parameter (shear stress produced by increasing shearing of the product) within the coordinated process window during the reaction time. The greatest sensitivity to shearing of the product is then seen in the course of time in which the formation of agglomerates or microcoagulum occurs and the measured quantity exceeds a tolerance value. The tolerance value is obtained in a comparable experiment in the non-optimized process window. The time window thus identified is therefore critical for this process parameter if it deviates from the acceptable value of the measured quantity in said window.

In a preferred embodiment of the invention, the coordinated process window is subject to a time change.

The invention relates to methods for determining a critical time window in a polymerization process which is carried out in a stirred reactor.

In an embodiment, the invention comprises a method for determining a time window in a heterophase polymerization, in which microcoagulum is formed, by continuous removal of a portion of the reaction mixture from the reaction container and pumped circulation and optionally recycling of the portion into the reaction container via a bypass which comprises a measuring arrangement which measures the increase in a particle size, the time window being present when the measured particle size is at least 1.5 times the expected statistical mean value of the end product.

The increase in the particle size is determined by monitoring the particle size. Use is made of the fact that the number of particles is constant during the polymerization, i.e. only the size of the particles increases during the reaction. By continuous repetition of the measurement, the increase in the particle size is detected thereby.

In a further embodiment, the invention comprises a method for determining a time window in which micro-coagulum and/or shear coagulum is produced by shear load in a polymerization process, by continuous removal of a portion of the reaction mixture from the reaction container and pumped circulation and optionally recycling of the portion into the reaction container via a bypass in which a high-speed stirrer produces a shear field in the product flowing around, and optionally induces the increase of the size of the polymer particles thereby, and subsequent detection of the polymer particles by filtration and/or optical and/or electrical detection.

In a further embodiment, the invention comprises a method for determining a time window in which mixing processes which optionally change in a disadvantageous manner (such as, for example, insufficient or excessively slow mixing in of reactants and/or micro-coagulum formation) as a result of the progress of the reaction and/or as a result of a change in the process parameters occur during the preparation process, the time window being determined by adding a suitable tracer to the reaction mixture and monitoring the homogenization of the reaction mixture by means of a suitable spectroscopic or electrochemical method in the container or in a bypass line. The critical time window is detected here by comparison of a suitable measured variable against the variation of its value in a comparative experiment in the non-optimized process window. For example, it is known that vinyl ester monomers undergo hydrolysis at unfavorable pH. The hydrolysis is a reaction which competes for the polymerization and leads to nonpolymeric byproducts which occur in the end product and present problems. In the case of insufficient mixing in and homogenization in a production container in the process window with a higher reaction temperature and non-neutral pH conditions, the level of byproducts increases.

The invention also relates to apparatuses for determining a critical time window in a polymerization process which is carried out in a stirred reactor.

The apparatuses according to the invention comprise means for removing a portion of the reaction mixture from the reaction container, means for pumping the portion of the reaction mixture and optionally means for recycling the portion of the reaction mixture into the reaction container, and means for measuring a physical property of the portion of the reaction mixture.

In an embodiment, the physical property to be measured is the particle size of polymer particles which are suspended in the portion of the reaction mixture. In another embodiment, the physical property to be measured is the distribution of a tracer in the portion of the reaction mixture. In a further embodiment, the physical property to be measured is the viscosity of the portion of the reaction mixture.

In a preferred embodiment, the apparatus according to the invention also comprises a container through which the portion of the reaction mixture is pumped, a high-speed stirrer which produces a shear field in the reaction mixture flowing around, and means for filtration and/or optical and/or electrical detection of polymer particles, being arranged in the container.

The invention furthermore relates to a method for carrying out a polymerization process in a stirred reactor, in which a critical time window in the process window (optionally changing as a function of time) is determined by means of monitoring at least one polymerization process parameter and a coordinated process window and, if a critical time window is present, optionally an adaptation of process conditions is carried out in order to configure the polymerization process to conform to the process window, i.e. to keep the process in the process window or to return the process to said window. At least one process parameter is actively adjusted to a new value which is advantageous for the process and/or the product, i.e. the process properties or product properties should not deteriorate. Conforming to the process window is not to be understood in such a way that a parameter, once chosen, is to be kept at its required value. Rather, a new value is chosen in a targeted manner so that the process remains within the variation of the prescribed process quantities as a function of time, i.e. follows the chronological specification, including possible changes in the required value of temperature, pressure, metering rates, stirrer speed, pH, etc. during the polymerization reaction.

In a preferred embodiment of the invention, the coordinated process window is subject to a change as a function of time. In a further preferred embodiment of the invention, the adaptation of the process conditions is effected by influencing the flow behavior.

It has been found that, for optimizing the polymerization process, it is often sufficient to adapt the shear stress only within the critical time window. This is the case in particular when opposing effects are produced by changing the parameter. An increase in the shear stress via the increase in the stirrer speed leads firstly to an improvement in the heat transfer, which permits more intensive cooling and thereby faster metering of the reactants; secondly, the specific power input is increased thereby and the stability of the product to shearing is possibly exceeded, with the result that the product quality may be adversely affected by formation of fine coagulum (specks). Likewise, on increasing the stirrer speed, the danger of shearing-induced coagulum formation in the product and on the stirrer surfaces and other container surfaces and increased foam formation on the product surface as well as introduction of air or gas into the stirred product itself increases.

Frequently, the process window will change during the polymerization process, corresponding to the various phases of the polymerization. Thus, during the metering phase of the process, the mixing of the components is of primary importance, with the aim of as homogeneous mixing as possible within as short a time as possible. During the reaction of the monomers, the aim is to suppress the formation of coagula; as the reaction progresses, attention is focused on the heat transfer, owing to the increase in the viscosity of the reaction mixture, whereas the power input must be controlled in particular in the stage of particle formation. Accordingly, a plurality of critical time windows may also occur during the polymerization process, which in each case are coordinated with a different phase of the reaction. It may also be appropriate to choose a different process parameter for each phase, for example the mixing time for the metering phase, the shear stress for the phase of coagulum formation, the heat transfer coefficient for the phase of viscosity increase and the power input for the phase of particle formation. Depending on the system, the phases may also occur simultaneously or may overlap with respect to time. If no critical time window was detected, this means that the polymerization process is not critical with respect to this process parameter in the limits investigated and this can be further increased for optimization purposes until it becomes critical.

The adaptation of the process conditions in the presence of a critical time window in order to configure the polymerization process to conform to the process window, i.e. to keep the process parameter under consideration within the process window or to return it there in the event of a deviation, can be effected by influencing the flow behavior of the reaction mixture, for example by variation (as a rule an increase) of the stirrer speed. This may be linear as a step or nonlinear; it may also take place several times or be periodically increased and decreased. A further possibility is to change (as a rule increase) the reaction temperature in order to reduce the viscosity of the product and to increase the reaction rate and the cooling performance of the reactor.

The method according to the invention can be used in various types of polymerization processes, in particular mass, solution, emulsion and suspension polymerization. In emulsion polymerization, which is preferred in its semi-batch form, a lower pressure at the end of the reaction and faster metering of the monomers can also be achieved with concomitant use of low-boiling monomers, in addition to reduction of coagulum formation and improvement of heat removal. In the case of suspension polymerization, the method according to the invention permits not only a shortening of the cycle time and of the pressure increase in the method but also improved control of the particle size and particle size distribution. In solution polymerization, particularly in the case of very viscous products, improvements in the heat removal and in the mixing in of the condensate returning from the evaporative cooling can be achieved. This applies to a comparable extent also for emulsion polymerization, mass polymerization and polyaddition and polycondensation reactions. The polymerization can be initiated by means of free radicals, cationically or anionically.

The method according to the invention can be used in a comparable manner also in the case of polycondensation and polyaddition reactions in which low molecular weight building blocks are converted in solution or in the absence of a solvent by chemical reactions into high molecular weight polymers. In these processes, the process-relevant parameters, such as heat transfer coefficient, mixing time and power input, in exceptional cases also shear stress when foaming systems are present, are also monitored in addition to the reaction parameters.

Polymerization reactions can be carried out or begun at low reaction pressure, e.g. reduced pressure, under air or under inert gas or can be carried out in the case of gaseous starting materials under high pressure up to 200 bar. Depending on the reactivity of the starting materials, reaction temperatures of from −40° C. to 180° C. are chosen, preferably from 10° C. to 150° C., very particularly preferably from 60° C. to 130° C.

A particular embodiment represents heterophase polymers in which the polymer is present in a separate phase. This separate phase is finely dispersed in a solvent, as a rule water, and its proportion is usually from 30 to 70% by weight. The products may be present in monomodal, bimodal or polymodal form, i.e. have either uniform particle sizes or very nonuniform particle sizes, which means that, for example, small particles are present in addition to large particles. The particle size is in the range from 30 nm to 1 μm, preferably in the range from 100 to 600 nm. Typical pH values of the products are in the range from 3 to 9, and the dynamic viscosities are in the range from 0.01 to 2 Pa·s. Non-Newtonian rheology behavior also frequently occurs as a complicating factor in the case of such products. The auxiliaries concomitantly used in the synthesis, the particle size distribution of the particles and the intrinsic pH and the viscosity are usually specified and defined by the technical field of use of the products. Preferably, the polymer composition which has been found in a laboratory experiment and has proven to be suitable for the application is retained if it is repeated on the production scale, since frequently approvals are related to the polymer compositions.

A preferred embodiment of the method according to the invention makes use of free radical emulsion polymerization of unsaturated monomers. Such monomers are esters of acrylic and/or methacrylic acid with C1- to C12-alcohols in the side chain, styrene, acrylonitrile, acrylic and/or methacrylic acid and/or amides thereof, vinyl acetate, butadiene, vinyl chloride and/or vinylidene chloride. The monomers can be reacted alone to give homopolymers or, in certain mixtures, lead to corresponding copolymers. The reaction is usually initiated by means of diazo compounds or peroxides, such as hydrogen peroxide, alkali metal peroxodisulfates or hydroperoxides, if necessary in combination with reducing agents and polyvalent metal salts. Crosslinking agents, chain-transfer agents and emulsifiers and further assistants, such as neutralizing agents and preservatives, can be mentioned as further, important additives, the use and deployment of which are sufficiently well known to a person skilled in the art from the prior art. The use thereof leads to suitable polymer properties and product qualities.

Below, the process parameters which can be utilized in the method according to the invention are described:

In the case of aqueous systems of heterophase polymers, in particular pH and electrolyte stability of the colloidal systems play a decisive role, in particular in the initial phase of the polymerization reaction. These quantities can be quantitatively determined and monitored by a pH probe or a conductivity-measuring probe in the polymerization container.

The monitoring of the conversion of the reaction is to be determined either online or by discrete sampling. In online monitoring, either the mass fraction of the polymer formed by the polymerization reaction is determined or the liberated enthalpy of reaction of the system as a function of the monomer mass metered in is determined in a calorimeter serving as reaction vessel. It is also possible to determine the increase in the polymer content by measuring the speed of sound in the reaction mixture or by monitoring an NIR absorption band characteristic for the polymer. Alternatively, it is of course also possible to take samples at certain time intervals and to investigate them with regard to their polymer content or the content of unconverted starting materials. In certain cases, a decrease in the concentration of a monomer can also be directly monitored.

The measurement of the power consumption and of the torque of the stirring member is effected by monitoring and measuring the rotational speed and the power consumption of the electrical drive, after appropriate correction of the frictional losses.

For the power consumption P, there is the following relationship with the stirring conditions:

$$P = Ne \cdot n^3 \cdot d^5 \cdot \rho$$

where Ne=power characteristic (Newton number), which combines the geometrical data of the container, of the flow in the container and of the viscosity of the product; n=stirrer speed, d=stirrer diameter and $\rho$=density of the reaction mixture. With a knowledge of the power consumption P of the reaction mixture, which is distributed in the volume of the reaction mixture V, an average, effective shear rate $\tau$ can be calculated:

$$\tau = C \cdot P / (n \cdot V)$$

in which C is a characteristic constant for the container and the reaction mixture.

Frequently, discrete polymer particles are present, for example in the case of emulsion polymerization. The progress of the polymerization manifests itself here through uniform increase in the polymer particle size, which increase can be monitored by measurement of the averaged particle size of the particles by means of a light scattering probe. For some applications and products, it is important also to monitor the molecular weight distribution in addition to the conversion of the reaction. This is effected by discrete sampling and measurement in a GPC unit. By automated sampling of the reaction batch and direct application to appropriate GPC columns, it is possible to detect the molecular weight distribution more or less in real time. With the aid of the sampling technique, it is also possible easily to monitor the surface tension of aqueous systems as a function of time.

With the knowledge of the viscosity variation of the liquid phase, the mixing times which are important for industrial reaction containers can also be determined either by tracer methods, for example by decolorization reactions, or by addition of a reacting substance and monitoring of the decrease in the concentration thereof—or, in the case of the addition of an inert component—the rate of the concentration homogenization thereof. If, for example, the mixing in of an inert additive metered from above becomes more difficult with increasing reaction viscosity, a mixing time can be determined from its concentration curve of an NIR probe mounted on the reactor bottom. For simple model calculations, the person skilled in the art finds in the literature (e.g. Ullmann's Enzyklopädie der technischen Chemie, 4th edition, 3rd volume, page 259 et seq.) idealized relationships which permit an estimation of the mixing time $\theta$:

$$n\theta = f(Re) \text{ and } Re = nd^2 \cdot \rho / \eta$$

Here, the mixing time is a function of the Reynolds' number Re, which is composed of the rotation speed n, the stirrer diameter d and the density and viscosity of the reaction medium.

The degree of dispersing can be measured in an analogous manner by means of a light scattering device. As a result of increasing dispersion owing to a shear energy introduced, the mean particle size in the case of solids or the drop size in the case of liquid phase which is immiscible with the solvent (e.g. in an emulsion) decreases, which can be measured by the time-averaged particle size.

The heat transfer coefficient or heat transition coefficient describes the quality with which heat of reaction can be removed from the interior of a reactor to the environment or the cooling medium. It depends both on the geometrical data and on material, coolant and product properties, which are sufficiently well known to the person skilled in the art. The decrease in this value is generally strived for because it is possible whereby to cool the reaction mixture more effectively. The definition of the heat transition coefficient k is $$\text{heat of reaction} = k \cdot \text{heat-exchange area} \cdot \text{temperature difference}$$

if it is assumed that the total heat of reaction must pass through the reactor wall, which represents the heat-exchange area, and a temperature difference exists between the reactor content and the cooling medium.

The heat transfer coefficient can be determined and monitored in a particularly simple manner by measurement in a calorimeter device. Here, the proportion of monomers which was metered into the reaction vessel is known, and hence the maximum enthalpy of reaction which is to be expected. By measuring the enthalpy of reaction which is actually removed via cooling, the conversion of the reaction can be determined at any time during the reaction. The very important question in emulsion polymerization regarding the average number of active centers n in a polymer particle, which control the average reaction rate and therefore also the rate of enthalpy of reaction, the copolymerization behavior and the degree of branching, is experimentally accessible via a so-called bypass measurement. Here, a small stream is pumped from the reaction vessel via a pump through a measuring cell suitable for the measurement. For example, the magnetization of a sample can be determined in a measuring head of an ESR device. According to this technique, other spectroscopic measurements or light scattering experiments can also be carried out.

Instabilities in colloidal systems are frequently distinguished in that coagulation of particles occurs. The diameter of this particle increases thereby and this can be monitored by measurement. Depending on the size of the particles, the terms microcoagulum or fine coagulum, specks, grit or coarse coagulum are used; all these phenomena are undesired since they reduce the quality of the end product, may have to be removed with considerable effort or accumulate as deposits in the polymerization container and must then be removed in an extensive manner by cleaning. Moreover, there is the danger that, although the products can be prepared, they have insufficient stability under the conditions of the application. As a rule, the instabilities increase with increasing temperature.

Yet further measured quantities which can be used for monitoring the reaction are, of course, known to the person skilled in the art. The invention relates to the use of the known methods for detecting critical time windows, which are then used to make the polymerization process safer or to obtain the product in better quality.

The invention furthermore relates to some measuring arrangements, devices and methods by means of which time windows can be investigated in order to detect deviations from the normal course of the polymerization reaction.

Suitable containers for the preparation of the polymers are sufficiently well known to the person skilled in the art from the prior art, e.g. J. R. Richards, Computers and Chemical Eng. 30 (2006) 1447-1463 and Ullmann's Encyclopedia of Industrial Chemistry, 4th Ed., Vol. 3, pp. 505-510. Frequently, internals, e.g. baffles, are also present. As a rule, the metallic wall materials of the container, of the stirrer and of the internals are either electropolished or provided with a suitable coating.

Stirrer designs and process-relevant description of the stirring operation are known to the person skilled in the art from a multiplicity of publications (for example, Winnacker, Chem. Technologie, 4th edition, vol. 6, page 336, Munich 1982; Ullmann's Enzyklopädie der technischen Chemie, 4th edition, vol. 2, page 259, Weinheim). Compared with standard stirring processes, for example the preparation and homogenization of solutions, additional difficulties occur in polymer preparation. One of the greatest problems here is ensuring as uniform stirring as possible in the total reaction mixture so that firstly no stationary zones with a large monomer excess and secondly no zones with high shearing can form. The continuously changing composition of the reaction mixture and the associated transport reactions of the monomers, assistants and heat of reaction set constantly changing requirements with regard to the stirring system, in particular in stirred tanks in which different products are produced, optionally even by different polymerization reactions.

One of the objects is to provide a method in which, during the preparation process, in the region of critical time windows, suitable process quantities are changed so as to obtain the product in conformity with the process and in conformity with quality requirements.

Time window is understood as meaning a time-limited period during the preparation process, in particular, but not exclusively, during the actual polymerization. Depending on duration and the rate of the reaction, this may be from minutes up to about 2 hours, as a rule from 1 to about 30% of the actual reaction time. Critical time window is to be understood as meaning the time in which the process (or the product properties) deviates or threatens to deviate from its optimally prescribed reaction path, i.e. path in conformity with the process, and requires a corrective measure. A plurality of time windows which optionally depend on different process qualities and optionally also overlap may also exist. The term chronological changes of the process window is used if, in this time window, one or more process parameters change, for example the temperature of the reaction mixture increases in a heating phase.

For determining the critical time window in which microcoagulum and/or shear coagulum is produced by a shear load in a polymerization process, it is possible to use different methods which are based on subjecting the reaction mixture or part thereof to a shear load at different times during the polymerization process and investigating the effect of the load on the fine coagulum content by a suitable method. Shear loading can be effected both directly in the polymerization reactor and on a portion of the reaction mixture which is removed continuously (bypass line) or batchwise (sampling). A certain shear load can be achieved in different ways known to the person skilled in the art; these include, for example, stirring in the reactor or in an external arrangement, pumped circulation, forcing through a capillary or other constriction which makes it possible to achieve a high shear load. The suitable methods for detecting or quantitatively determining the coagulum in the dispersion are also known to the person skilled in the art. These include, for example, particle counters described (Coulter counter), measurement of the pressure increase on filtration of the loaded dispersion through a suitable filter, measurement of the pressure increase on forcing the dispersion through a capillary, measurement of the light scattering of the product before and after the shear loading or filtration and weighing of the coagulum, etc.

Preferred embodiments of the method for determining critical time windows will now be described:

Suitable measuring devices in a certain arrangement on the polymerization container have proven useful for determining time windows. A particle counter (Coulter counter) which detects particles in the μm range according to the Coulter principle is used in particular for cell culture determination but can be used in the area of polymer dispersions in order to detect incipient coagulation when larger particles, which are designated as microcoagulum or specks by the person skilled in the art, form from normal dispersion particles by agglomeration. Such impurities in the end product are undesired since they are evidence of a reduction in the quality of the end product and as a rule cannot be removed or can be removed by filtration only with very great effort and time requirement. For applications, for example, in unpigmented clear coats, microcoagulum is even absolutely undesired.

By means of a semiautomatic arrangement, a sample, diluted online with an electrolyte suitable for the measurement, can be pumped from the reacting system through the measuring arrangement, which detects the number of particles found per unit time. Depending on the software, it may also be possible to calculate an averaged distribution.

By varying the parameters during the preparation, for example, the increase of particles having a size of 2 μm as a function of time is monitored. In addition to the reaction temperature, feed time and concentrations, influencing variables due to the chosen composition, such as pH, for example due to amounts of bases or buffers metered in, or emulsifier concentrations, solids content, viscosity, amount of initiator or the polymer polarity, also serve as possible variables for controlling the process. It is sufficiently well known for the person skilled in the art that all these parameters have influence on the stability of the product, associated in each case with corresponding disadvantages. For example, too high a pH or too high a polymer temperature leads to increased hydrolysis of the monomers or polymers and hence to an increase in the volatile odor substances while an increase in the emulsifier concentration leads to increased foam formation tendency.

In the case of transparent polymer solutions, the bypass described can be used for passing the reaction mixture through a continuous measuring cell by means of which an IR or UV absorption measurement or a rheological measurement is effected. If an inert material which has suitable absorption bands in the spectrum is added to the reaction mixture at a certain time during the preparation as trace marking at a point of the reactor, homogenization can be monitored spectroscopically in the bypass. This makes it possible to draw conclusions about the mixing time, depending, for example, on stirring conditions, such as power consumption, or on the instantaneous viscosity of the mixture. The marking can also be carried out several times in succession or can be monitored by various inert substances.

For determining the shear load, a small container in which a suitably shaped stirrer is present is installed in the bypass line of the polymerization container. This shape can be arbitrarily chosen. However, advantages have been found if the wall spacing is chosen to be small, about 1 mm, and the stirrer blade extends over the entire volume of the container. The stirrer motor can produce very high rotational speeds (up to 10 000 rpm) and is continuously controllable. Present immediately after this stirring cell is a filter cell comprising a 2 μm filter which filters the bypass mixture continuously. Pressure transducers which register a pressure increase in the line as a result of an increase in the filter occupancy are present in the bypass cycle. During the entire polymerization time, hot reaction medium flows through the bypass line, the stirrer cell and the filter cell. For increasing the stirrer speed, a very high shear load which leads to the formation of coagulum can be exerted on the instantaneous reaction mixture. The deposition of coagulum on the filter surface then increases the pressure difference at the filter. The magnitude of the pressure difference reflects the filter occupancy and hence the sensitivity of the reaction mixture to shearing. Of course, the measurement of the increase in size of the particles or of the microcoagulum, optionally after dilution, can be effected by an optical method, for example by light scattering, or by an electrochemical method, for example by Coulter measurement. The spatial separation of polymerization, shearing and coagulum removal prevents shear coagulum which has formed being recycled into the reactor, while comparable conditions can always be established in the reactor for the preparation of the product. An extension of the bypass line to a second measuring device gives further measured data; expediently, the extension can be switched on separately by valves at a suitable time.

If the shear load is changed periodically in the course of the preparation process, the sensitivity of the reaction mixture to shearing can be sampled as a function of the reaction time. The simple case, namely flow through the cells stirred at constant speed, also directly gives the time window in which the reaction mixture is unstable under the applied shear stress.

The occurrence of critical time windows can frequently easily be interpreted with a knowledge of the ongoing process, although the chemical-kinetic, physical and process-related relationships in the emulsion polymerization are very complex. It should be noted, for example, that the particles increase in size as a result of the polymerization process under polymerization conditions in which the total particle count remains constant. According to the increase in size, the total surface area of the particles on which the stabilizing emulsifier molecules are present in absorbed form increases. If the increase in the surface area of the polymeric phase takes place more rapidly than the rate of addition of the stabilizing emulsifiers, the colloidal stability of the system generally decreases. The influence of the pH and of the viscosity can also be explained in a comparable manner. The cooperation of these influences gives rise, during the preparation process, to very specific phases (critical time windows) having particularly high sensitivity, during which counteraction may be necessary. Depending on the cause of the reduced stability, such measures may be briefly adapted stirrer speed changes, the change in the monomer metering rate and hence in the generation of heat of reaction, a pH change, increased emulsifier metering, dilution by solvent addition, a change in the reaction temperature, viscosity regulation, changed initiator metering or adaptation of the pressure conditions (in the case of reactions under pressure).

The invention also comprises a computer program comprising program code which is suitable for carrying out a method according to the invention if the computer program runs on a suitable computing or control device.

Of course, the abovementioned features and the features still to be explained below can be used not only in the respective stated combination but also in other combinations or alone without departing from the scope of the present invention.

The invention is illustrated below on the basis of some working examples with reference to the figures.

EXAMPLES

Example 1a

Figure 1:
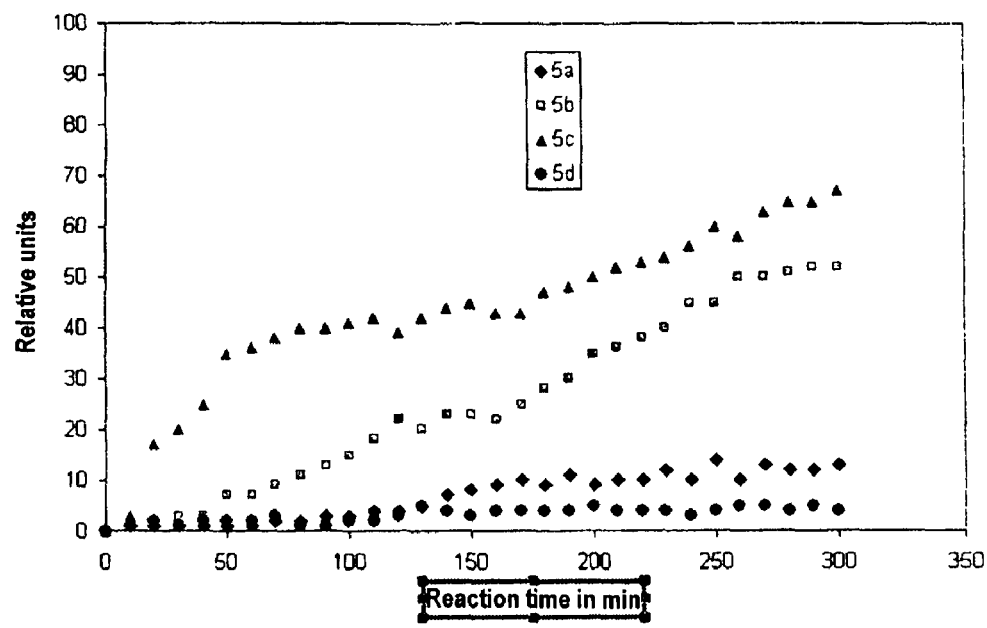
FIG. 1 shows a graph of the results of the measurement of the coagulum formation from an experimental example 5, the amount of coarse particles being plotted in relative units against the reaction time.

A mixture of 5.5 kg of water, 0.52 kg of emulsifier 1 and 125 g of itaconic acid is initially taken under nitrogen in a 40 l reactor equipped with an MIG stirrer and is heated to 95° C. after addition of 5% of feed 1 at 140 rpm. After addition of 0.60 kg of a 5% strength solution of sodium peroxodisulfate, the remainder of feed 1 is metered in after 10 min and, simultaneously therewith, a solution of 2.25 kg of a 4.4% strength sodium peroxodisulfate solution is metered in 4 h. After a further 2 h at 90° C., treatment is effected with a solution of 0.9 kg of a 2% strength solution of tert-butyl hydroperoxide and 0.95 kg of a dilute, aqueous solution of 66 g of sodium hydrogen sulfite (40% strength) and 5 g of acetone in 2 h and thereafter cooling to 50° C. is effected and a pH of about 5.5 is slowly established with sodium hydroxide solution. After addition of customary amounts of antifoam and bactericide, unconverted monomer is removed with steam over the course of 5 h. A 47% strength, coagulum-free dispersion, pH about 5.7, particle size 82 nm (light scattering) and a glass transition temperature of about 4° C., is obtained. The viscosity was determined as 150 mPa·s (Brookfield, RV, spindle 2, 100 rpm, 25° C.). 50 ppm of styrene and 20 ppm of phenylcyclohexene (PCH) were found by gas chromatography, but no butadiene and acrylonitrile.

Composition of Feed 1 (Metered Simultaneously from Different Containers):

6.2 kg of water
0.3 kg of 30% strength solution of a sulfated C12 fatty alcohol ethoxylate (3 EO) (emulsifier 1)
0.27 kg of sodium hydroxide solution (25% strength)
0.6 kg of acrylic acid
7.2 kg of styrene
0.8 kg of acrylonitrile
0.45 kg of acrylamide (50% strength)
6.0 kg of butadiene
0.45 kg of chain-transfer agent
0.5 kg of water for flushing the pipes Examples 1b-e Example 1a was reproduced and the speed during the reaction was changed according to the following data:
b) stirring for 180 min at 90 rpm, 180 min at 140 rpm
c) stirring for 15 min at 90 rpm, 345 min at 140 rpm
d) stirring for 15 min at 140 rpm, 345 min at 90 rpm
e) permanent speed change between 140 and 90 rpm (in each case 10 min decrease then 10 min increase)

Example 1f

The coagulum contents of the products 1a-e produced are summarized in the following table. The tendency to foam formation during the reaction as well as in the finished product did not differ. The physical data of the products do not differ in the accuracy of the measurement from those of example 1a.

The coagulum values (cf. tab. 1) were obtained by sieve fractionation over a 4-fold screen by diluting 1.0 kg of dispersion with 1.0 kg of water and allowing it to run through the filter combination for 1 min. After drying (120° C.), the proportion of coagulum was determined gravimetrically.

TABLE 1

Coagulum contents in mg/kg dispersion

| Screen | A | B | C | D | E |
|---|---|---|---|---|---|
| 25 μm | 360 | 58 | 49 | 61 | 55 |
| 45 μm | 7 | 16 | 29 | 65 | 44 |
| 85 μm | 11 | 8 | 13 | 25 | 15 |
| 125 μm | 59 | 28 | 12 | 46 | 24 |
| Total | 437 | 110 | 103 | 197 | 138 |

It was found that the coagulum formation can be effectively reduced by reducing the stirrer speed in the first quarter hour of the reaction. The first 15 min are the critical time window for this product with regard to coagulum formation.

Example 2a

A bimodal polymer dispersion is prepared on the production scale. An initially taken mixture comprising 0.4 part of ascorbic acid in 86.6 parts of water is heated to 90° C. under nitrogen and stirred with a multi-speed stirrer at an external paddle speed of about 5 m/s. At 90° C., 14 parts of 5% strength sodium peroxo-disulfate solution are added and metering in of an emulsion according to feed 1 is begun. The addition is effected with the proviso that it is increased in the course of about 1 h slowly from an initial amount linearly in two stages to a maximum value (4 times the amount of the starting value) (time window 1), but is carried out in such a way that the complete cooling capacity of the reactor is utilized toward the end of the addition. For this purpose, a time of about 5.0 h is required for metering in the monomer emulsion. In this time, a further 39 parts of sodium peroxodisulfate solution are simultaneously metered in, and washing with 8 parts of water is effected.

The emulsion consists of

| Water | 161 parts, |
|---|---|
| 2-Ethylhexyl acrylate | 580 parts, |
| Methyl methacrylate | 51 parts, |
| Vinyl acetate | 27 parts, |
| Acrylic acid | 3 parts, | and 5.0 parts of emulsifier 2 and 6.0 parts of emulsifier 3, 5.0 parts of sodium hydroxide solution (25% strength) and a further 15 parts of a copolymerizable monomer. These components are added in stages in some cases.

Emulsifier 2 is a 45% strength solution of a neutralized bisalkyldiphenyl oxide disulfonate and emulsifier 3 is a sodium salt of a C12 fatty alcohol ether sulfate having about 30 mol of EO (calculated on the basis of 100%).

In the further, subsequent process steps, a further 29 parts of different raw materials are added so that a 65% strength by weight dispersion is present at the end. The dispersion is obtained in a coagulum-free form on filtration and has a pH of 4.7 and a viscosity of about 450 mPa·s (rotational viscometer at 100/sec).

Example 2b

Method 2a) is reproduced in the same reaction container. After an emulsion metering time of about 70 min (i.e. 10 min after time window 1), the speed of the stirrer is increased by 14% (time window 2). With further utilization of the maximum cooling power of the reactor, the emulsion metering time can now be shortened by 40 min or reduced by 13%. An improvement in the heat removal is achieved, and the measured physical quantities of the dispersion, including the particle size distribution and the performance characteristics, are identical within the tolerances of the measurement.

2c) Comparative Experiment

Comparative method 2a is reproduced in the same reaction container with the difference that an emulsion metering rate (maximum value) constant over the metering time is established, i.e., the metering rate in time window 1 is constant and is also maintained after time window 1. The stirrer speed is likewise left constant (constant stirrer speed in time window 2). The metering is effected with utilization of the maximum cooling capacity in a metering time of 4.5 h. During the preparation, the dispersion thickened.

By comparison of 2c with 2a, it is found that the first 60 min of the polymerization represent the critical time window 1 with regard to viscosity. Comparison of 2b with 2a shows that the optimization of the stirring conditions in time window 2 makes it possible further to reduce the metering time, which is limited by the heat removal.

Example 3a

An initially taken mixture consisting of 2.0 kg of water, and 0.2 kg of a 20% strength by weight seed latex is initially taken under nitrogen in a pressurized reactor having a capacity of 200 l and is heated. At an internal temperature of 75° C., 0.33 kg of feed 2 is added and heated to 80° C. in 1 h (time window 1). Thereafter, feed 1 and feed 2 are started and are added in 6.0 h. After the end of the feeds, the container is washed with 0.25 kg of water and the reactor content is heated to 85° C. for complete polymerization. After stirring for 1 h, cooling to 60° C. is effected and in each case a solution of 34.0 g of tert-butyl hydroperoxide (70% strength) in 0.20 kg of water and a solution of 21.0 g of sodium disulfite in 0.25 kg of water are added simultaneously in the course of 2 h. After stirring for a further hour, cooling is effected and neutralization is effected with 0.24 kg of a 25% strength by weight sodium hydroxide solution in 30 min and 20 g of an antifoam and 50 g of a customary, aqueous bactericide are added. The product is obtained in coagulum- and speck-free form, has a pH of 6.7, a dry value of 48.3% and a light transmittance (0.01% strength, 1 cm layer thickness, photometer) of 77% and can be easily filtered. A 1 kg sample is filtered through a 45 μm fine screen and leaves behind <0.01% of coagulum.

Composition of Feed 1:

| Water | 4.40 kg |
|---|---|
| Sodium pyrophosphate | 40 g |
| Emulsifier 2 | 50 g |
| Sodium lauryl sulfate (15%) | 104 g |
| Sodium hydroxide solution (25%) | 0.18 kg |
| Acrylic acid | 0.25 kg |
| Styrene | 1.36 kg |
| Acrylonitrile | 2.00 kg |
| n-Butyl acrylate | 4.40 kg |

Feed 2 is a solution of 46 g of sodium peroxodisulfate in 0.62 kg of water.

Example 3b

Experiment 3a) is repeated with the following difference:

The batch is prepared in a 1 m³ pressurized reactor and 5 times the stated amounts are used. The addition of feeds 1 and 2 is begun at an internal temperature of 85° C., the reactor content is further heated in 15 min (time window 1) and feeds 1 and 2 are then metered in at an internal temperature of 100° C. in 3.0 h. After complete addition, stirring is effected for 1 h at 100° C., then cooling to 60° C. is effected and the procedure is continued in a corresponding manner.

The product is obtained in coagulum- and speck-free form, has a pH of 7.0, a dry value of 49.8% and a light transmittance of 64% and can be easily filtered. A 1 kg sample is filtered through a 45 μm fine sieve and leaves behind 0.013% of coagulum.

Example 3c

Experiment 3a) is repeated with the following difference: the addition of feeds 1 and 2 is begun at an internal temperature of 95° C., the reactor content is further heated in 15 min (time window 1) and feeds 1 and 2 are then metered in at an internal temperature of 110° C. in 2.0 h. After complete addition, stirring is effected for 1 h at 110° C., then cooling to 60° C. is effected and the procedure is continued in a corresponding manner.

The product is obtained in coagulum- and speck-free form, has a pH of 6.9, a dry value of 49.9% and an LT value of 68% and can be easily filtered. A 1 kg sample is filtered through a 45 μm fine sieve and leaves behind <0.010% of coagulum.

Example 3d

Experiment 3a) is repeated with the following difference: the addition of feeds 1 and 2 is begun at an internal temperature of 95° C., the reactor content is further heated in 15 min (time window 1) and feeds 1 and 2 are then metered in at an internal temperature of 120° C. in 3.0 h. After complete addition, stirring is effected for 1 h at 120° C., then cooling to 60° C. is effected and the procedure is continued in a corresponding manner.

The product is obtained in coagulum- and speck-free form, has a pH of 6.9, a dry value of 49.9% and an LT value of 68% and can be easily filtered. A 1 kg sample is filtered through a 45 μm fine sieve and leaves behind <0.010% of coagulum.

Example 3e

Example 3d is repeated with the following change: the addition of feed 1 and feed 2 is carried out under pressure at an internal temperature of 120° C. (time window 1=0 min). The metering is effected in 3 h. Thereafter, the procedure is continued analogously to example 3a. The product is obtained with a low coagulum and speck content, has a pH of 6.5, a dry value of 49.3% and an LT value of 62% and can be easily filtered. The filtration test (45 μm screen) gives a coagulum value of 0.3% which is no longer tolerable. A molecular weight determination gives a lower molecular weight than the products from examples 3a-3d.

By comparison of examples 3a to 3e, it is found that the first reaction phase (time window 1) is critical with regard to the process variable of temperature and the coagulum content. Outside the time window, the higher temperature can be used for improving the cooling performance, which is reflected in a shorter metering time.

Example 4

The products from examples 3a, 3c and 3d were tested against a corresponding production material as a binder for paper coating slips. In addition to the proportion of coagulum, the product from example 3e proves to be unsuitable with regard to mechanical stability (stirring for 10 min with Ultraturrax stirrer at 5000 rpm, which represents a preliminary test) and viscosity and was not included in the testing.

TABLE 2

Formulation (all data in % by weight)

|  | 4a | 4b | 4c | 4d |
|---|---|---|---|---|
| Hydrocarb 90 [1] | 70 | 70 | 70 | 70 |
| Amazon 88 [2] | 30 | 30 | 30 | 30 |
| Polysalz S [3] | 0.4 | 0.4 | 0.4 | 0.4 |
| Sodium hydroxide solution 25% strength | 0.05 | 0.05 | 0.05 | 0.05 |
| CMC 7L2T [1] | 0.5 | 0.5 | 0.5 | 0.5 |
| Reference | 10 |  |  |  |
| Proportion of 3a |  | 10 |  |  |
| Proportion of 3c |  |  | 10 |  |
| Proportion of 3d |  |  |  | 10 |

[1] Commercial product of Omya, Cologne, Germany;
[2] Commercial product of Kaolin International B.V. Antwerp, The Netherlands;
[3] Commercial product of BASF AG, Ludwigshafen, Germany.

TABLE 3

Test results
Machine coating 10 g/m² on Scheufelen paper

|  |  | 4a | 4b | 4c | 4d |
|---|---|---|---|---|---|
| pH |  | 8.5 | 8.5 | 8.7 | 8.5 |
| Viscosity | 20 rpm mPa·s: | 850 | 850 | 850 | 1025 |
| (Brookfield) | 100 rpm mPa·s: | 270 | 270 | 270 | 320 |
| Pick resistance | NA cm/s | 124 | 119 | 122 | 120 |
| IGT dry | PA cm/s | 266 | 253 | 271 | 300 |
| Pick resistance IGT wet | 0.6 m/: % | 60.9 | 53.6 | 53.6 | 50.0 |
| Solid area(D) = 2.43 | D: | 1.48 | 1.30 | 1.3 | 1.21 |
| Offset test |  | >6 | >6 | >6 | >6 |

Example 5a

Determination of a Critical Time Window in the Preparation of a Dispersion in an Experimental Laboratory Apparatus with Particle Measurement A dispersion is prepared according to the following general method in a 4 l double-jacket glass apparatus having an attached stirrer motor (pilot plant), three separate feeds and an attached reflux condenser. The stirrer used is a three-speed crossbeam stirrer having a d/D ratio of 0.9, which is operated at 150 rpm (1.4 m/s paddle speed).

From a monomer mixture having the composition
50% by weight of n-butyl acrylate,
46% by weight of styrene,
2% by weight of acrylic acid,
2% by weight of methacrylic acid,
an emulsion was prepared using 0.1% by weight of emulsifier 2 and 0.1% by weight of sodium lauryl sulfate (in each case based on the sum of the monomers) in a container by thorough stirring. The composition of the emulsion is such that a 50% strength by weight dispersion is present at the end of the reaction.

0.30 kg of deionized water was initially taken in the reaction vessel, a defined amount of sodium lauryl sulfate was added and heating to 80° C. was effected under nitrogen. The amount of initially taken sodium lauryl sulfate is such that the mean particle diameter of the end dispersion is just 150 nm (light scattering). Alternatively, a corresponding amount of seed latex can also be used. 2% of the prepared monomer emulsion are added to the initially taken mixture, and a solution of 0.3% by weight of sodium peroxodisulfate in 200 g of water (=feed 2), a solution of 8.0 g of sodium bicarbonate in 200 g of water (=feed 3) and the remainder of the emulsion are metered in continuously in 3 h at the defined polymerization temperature.

Reaction mixture can be removed from the reaction space via a bottom opening and recycled by means of a small peristaltic pump. On the pressure side of the peristaltic pump, however, a small portion is branched off, thermostatted and diluted in a suitable ratio with an electrolyte solution and fed semicontinuously to a Coulter counter device. The measuring time is about 1 min; the next metering is effected thereafter.

By varying the composition and the reaction conditions, the occurrence of microcoagulum can be observed. The measuring arrangement thus permits the direct checking of the process quantities for determining critical time windows.

Example 5b

As in example 5a, but without sodium bicarbonate in feed 3.

Example 5c

As in example 5b, but at 95° C. polymerization temperature.

Example 5d

As in example 5a, with the difference that, after a feed time of 60 min (time window 1), the reaction temperature is slowly increased to 95° C. in 15 min and the stirrer speed is also increased during this procedure to 200 rpm (time window 2).

The results of the measurement are reproduced in FIG. 1. The omission of an assistant (sodium bicarbonate, example 5b compared with example 5a) shows the formation of microcoagulum during the entire reaction and in example 5c in the critical time window of 60 min by an increase in the relative units of the measured signal. At lower reaction temperature in time window 1 and in the presence of the assistant, no formation of the microcoagulum is observed, even if the shear load is increased by increasing the stirrer speed in time window 2. Time windows 1 and 2 relate to different process variables and do not overlap.

Example 6

Figure 2:
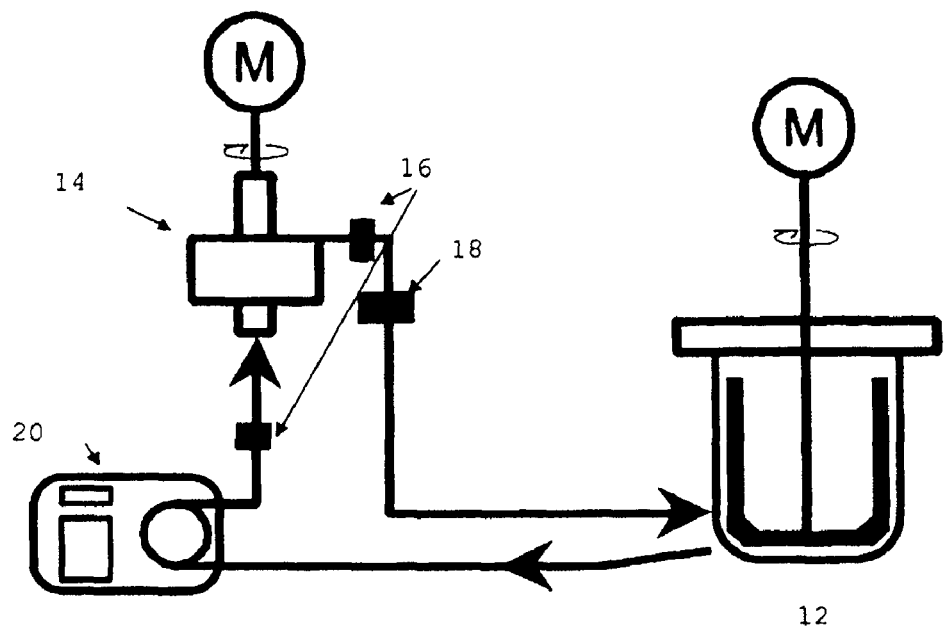
FIG. 2 shows a schematic diagram of a measurement arrangement according to the invention comprising a rheological cell.

Determination of a Critical Time Window in the Preparation of a Dispersion in an Experimental Laboratory Apparatus by Means of a Shear Cell Example 5b is repeated. A peristaltic pump 20 (delivery of not more than 120 ml/min) which pumps the reaction mixture at 25 ml/min through a rheological cell 14 is present in the bypass line (cf. FIG. 2). The cell 14, in which a cylindrical rotor driven by a motor M rotates in a controllable manner up to 10 000 rpm, has a volume of 25 ml. Behind the cell 14, a planar filter 18 having a pore diameter of 2 μm is installed in the pumped circulation. The filter occupancy is determined by measuring the pressure difference by means of pressure transducers 16 before and after the filter 18 and is registered in a computer or a control device (not shown) as a function of the reaction time during the measurement (=increase in the rotational speed in the cell). The filtrate is recycled in thermally insulated lines into the reaction container 12.

Five min after the start of the polymerization, the speed program for the measurement in the shear cell 14 is started for the first time. From the rest speed (50 rpm), the speed is increased to 3000 rpm within 40 sec, maintained for 20 sec and reduced again to 50 rpm in 20 sec. The pressure of the two load cells 16 and the corresponding pressure difference and the temperature of the medium are registered continuously. The instantaneous solids content in the reactor 12 is determined computationally from the metering time and the metering rate and the composition of the monomer emulsion. At a pressure difference of 150 mbar, the filter is fully occupied.

| Metering time [min] | Solids [%] | Pressure difference [mbar] |
|---|---|---|
| 0 | 11 | 0 |
| 6 | 19 | 2 |
| 16 | 28 | 2 |
| 26 | 33 | 2 |
| 36 | 37 | 3 |
| 46 | 39 | 3 |
| 56 | 41 | 3 |
| 66 | 43 | 3 |
| 76 | 44 | 3 |
| 86 | 45 | 4 |
| 96 | 46 | 14 |
| 106 | 47 | 26 |
| 116 | 47 | 45 |
| 126 | 48 | 80 |
| 136 | 48 | 150 |
| 146 | 49 | 150 |
| 156 | 49 | 150 |
| 166 | 49 | 150 |
| 176 | 50 | 150 |
| 180 | 50 | 150 |

The apparatus shows the increase in deposited fine coagulum, beginning after a reaction time of about 85 min. In this case, the critical time window is to be regarded as being from a reaction time of about 80 min.

The invention claimed is:

1. A method for carrying out a polymerization process in a stirred reactor, comprising:
   (i) determining at least one critical time window, wherein the critical time window is at least one time interval within the polymerization process during which the process shows an actual or an expected divergence from a designated optimal reaction path of the polymerization process, by monitoring at least one polymerization process parameter and an associated range (a "process window"), in which a reaction product is obtained which meets requirements, as a function of reaction time; and
   (ii) adapting one or more process conditions during the critical time window, in order to maintain the polymerization process parameter within the process window, wherein the adapting (ii) is effected by controlling flow behavior by changing stirrer speed in a stirred reactor.

2. The method according to claim 1, wherein the determining of the critical time window (i) is effected by comparison of a detected value for the at least one polymerization process parameter with the process window.

3. The method according to claim 1, wherein the process window varies over time.

4. The method according to claim 1, wherein the at least one polymerization process parameter is the heat transfer coefficient.

5. The method according to claim 1, wherein the at least one polymerization process parameter is the mixing time.

6. The method according to claim 1, wherein the at least one polymerization process parameter is the shear stress.

7. The method according to claim 1, wherein the at least one polymerization process parameter is the specific power input.

8. The method according to claim 1, wherein the polymerization process is an emulsion polymerization process.

9. The method according to claim 1, wherein the polymerization process is a suspension polymerization process.

10. A method for determining a time interval within a polymerization process in a reaction container, wherein a microcoagulum is formed, comprising:
   (i) continuously removing of a portion of a reaction mixture from the reaction container by pump circulation via a bypass comprising a mean particle size increase measuring arrangement;
   (ii) determining an increase in particle size in the portion of the reaction mixture; and
   (iii) optionally, recycling the portion into the reaction container,
   wherein the time interval is present when a measured particle size exceeds at least 1.5 times an expected statistical mean particle size of an end product.

11. A method for determining a time interval within a polymerization process in a reaction container, wherein a microcoagulum and/or shear coagulum is produced by shear load in the polymerization process, comprising:
   (i) continuously removing of a portion of a reaction mixture from the reaction container by pump circulation via a bypass comprising a high-speed stirrer producing a shear field in a circulating product; and
   (ii) detecting polymer particles in the portion by filtration and/or detecting an increase of microcoagulum optically and/or electrically; and
   (iii) optionally, recycling the portion into the reaction container.

12. A non-transitory computer-readable storage medium with a computer-executable program stored thereon, wherein the program instructs a microprocessor of the computer to execute a method which
   determines at least one time interval within a polymerization process in a reaction container, wherein a microcoagulum is formed, wherein a portion of the reaction mixture is continuously removed from the reaction container by pump circulation via a bypass comprising a mean particle size increase measuring arrangement, and, optionally, the portion is recycled into the reaction container wherein the time interval is present when the measured particle size exceeds at least 1.5 times the expected statistical mean particle size of an end product.

13. A non-transitory computer-readable storage medium with a computer-executable program stored thereon, wherein the program instructs a microprocessor of the computer to execute a method which
   determines a time interval within a polymerization process in a reaction container, wherein mixing processes occur during the polymerization process and the mixing processes may change in a disadvantageous manner as a result of reaction progress and/or as a result of a change in process parameters, wherein a suitable tracer is added to a reaction mixture; and homogenization of the reaction mixture is spectroscopically or electrochemically monitored in the reaction container or in a bypass line.

14. A non-transitory computer-readable storage medium with a computer-executable program stored thereon, wherein the program instructs a microprocessor of the computer to execute a method which
   determines a time interval within a polymerization process in a reaction container, wherein a microcoagulum and/or shear coagulum is produced by shear load in the polymerization process, wherein a portion of a reaction mixture is continuously removed from the reaction container by pump circulation via a bypass comprising a high speed stirrer producing a shear field in a circulating product, and an increase of microcoagulum is detected by filtration of polymer particles and/or optically and/or electrically, wherein, optionally, the portion is recycled into the reaction container.

15. The method according to claim 10, comprising recycling the portion into the reaction container.

16. The method according to claim 11, comprising recycling the portion into the reaction container.

17. The method according to claim 11, wherein the detecting comprises the filtration.

18. The method according to claim 11, wherein the detecting comprises detecting an increase of microcoagulum optically.

19. The method according to claim 11, wherein the detecting comprises detecting an increase of microcoagulum electrically.

20. The method according to claim 11, wherein the detecting comprises detecting an increase of microcoagulum optically and electrically.

21. The method according to claim 11, wherein the detecting comprises the filtration and detecting an increase of microcoagulum optically.

22. The method according to claim 11, wherein the detecting comprises the filtration and detecting an increase of microcoagulum electrically.

23. The method according to claim 11, wherein the detecting comprises the filtration and detecting an increase of microcoagulum optically and electrically.

* * * * *